(12) United States Patent  
Tamai

(10) Patent No.: US 9,976,458 B2  
(45) Date of Patent: May 22, 2018

(54) HONEYCOMB STRUCTURE BODY

(71) Applicant: DENSO CORPORATION, Kariya, Aichi-pref. (JP)

(72) Inventor: Koji Tamai, Nagoya (JP)

(73) Assignee: DENSO CORPORATION, Kariya (JP)

( * ) Notice: Subject to any disclaimer, the term of this patent is extended or adjusted under 35 U.S.C. 154(b) by 501 days.

(21) Appl. No.: 14/638,369

(22) Filed: Mar. 4, 2015

(65) Prior Publication Data

US 2015/0252704 A1    Sep. 10, 2015

(30) Foreign Application Priority Data

Mar. 5, 2014  (JP) ................................ 2014-042955  
Jan. 21, 2015  (JP) ................................ 2015-009331

(51) Int. Cl.
| | | |
|---|---|---|
| B01D 46/24 | (2006.01) | |
| C04B 38/00 | (2006.01) | |
| F01N 3/022 | (2006.01) | |
| F01N 3/28 | (2006.01) | |
| C04B 35/195 | (2006.01) | |

(52) U.S. Cl.
CPC ....... *F01N 3/0222* (2013.01); *B01D 46/2429* (2013.01); *B01D 46/2474* (2013.01); *C04B 35/195* (2013.01); *C04B 38/0009* (2013.01); *C04B 38/0074* (2013.01); *F01N 3/2828* (2013.01); *B01D 2046/2433* (2013.01); *B01D 2046/2437* (2013.01); *C04B 2235/3218* (2013.01); *C04B 2235/349* (2013.01); *C04B 2235/3418* (2013.01); *C04B 2235/3445* (2013.01); *C04B 2235/5296* (2013.01); *F01N 2330/06* (2013.01); *F01N 2330/48* (2013.01); *F01N 2330/60* (2013.01); *Y10T 428/24149* (2015.01)

(58) Field of Classification Search  
None  
See application file for complete search history.

(56) References Cited

U.S. PATENT DOCUMENTS

2007/0294989 A1    12/2007   Ichikawa  
2010/0037573 A1 *   2/2010   Komori ............. B01D 46/2459  
                                                                   55/419

(Continued)

FOREIGN PATENT DOCUMENTS

JP         2-253825        10/1990  
JP         3-151049         6/1991

(Continued)

*Primary Examiner* — Nicholas W. Jordan  
(74) *Attorney, Agent, or Firm* — Nixon & Vanderhye P.C.

(57) ABSTRACT

A honeycomb structure body has cell walls arranged in a lattice arrangement and a plurality of cells surrounded by the cell walls. The honeycomb structure body has a cell density distribution in which a cell density is reduced continuously or stepwise from a center portion to an outer peripheral portion in a radial direction. The honeycomb structure body has wave shaped cell walls and flat shaped cell walls which extend in an axial direction. Particularly, the wave shaped cell walls are formed in a formation section having a cell density ratio of not more than 0.85 to a maximum cell density. The region having the flat shaped cell walls is inside the region having the wave shaped cell walls.

6 Claims, 8 Drawing Sheets

(56) References Cited

U.S. PATENT DOCUMENTS

| | | | | |
|---|---|---|---|---|
| 2011/0162348 A1* | 7/2011 | Kim | ................ | F01N 3/2066 |
| | | | | 60/274 |
| 2011/0203242 A1* | 8/2011 | Goto | ................ | B01D 46/2429 |
| | | | | 55/523 |
| 2015/0047307 A1 | 2/2015 | Hayashi et al. | | |

FOREIGN PATENT DOCUMENTS

| | | |
|---|---|---|
| JP | 2006-263947 | 10/2006 |
| JP | 2008-018370 | 1/2008 |
| JP | 2013-154278 | 8/2013 |

* cited by examiner

HONEYCOMB STRUCTURE BODY

CROSS-REFERENCE TO RELATED APPLICATION

This application is related to and claims priority from Japanese Patent Applications No. 2014-42955 filed on Mar. 5, 2014, and No. 2015-9331 filed on Jan. 21, 2015, the contents of which are hereby incorporated by reference.

TECHNICAL FIELD

The present invention relates to honeycomb structure bodies having a structure in which a cell density is reduced continuously or stepwise from a center portion to an outer peripheral portion in a radial direction of the honeycomb structure body.

BACKGROUND ART

There has been known a device having a honeycomb structure body arranged inside of an exhaust gas pipe, which is capable of purifying exhaust gas emitted from an internal combustion engine mounted on a motor vehicle, etc. In general, the honeycomb structure body has a plurality of cell walls and cells. The cell walls are arranged in a lattice arrangement. Each of the cells is formed by the cell walls. When a high temperature exhaust gas flows in the cells of the honeycomb structure body, catalyst supported by the honeycomb structure body is activated and the activated catalyst purifies exhaust gas. In the inside of the exhaust gas pipe, there is a tendency that a large amount of exhaust gas flows in the center portion in a radial direction of the honeycomb structure body, and a small amount of the exhaust gas flows in an outer peripheral portion of the honeycomb structure body. Accordingly, the flow speed of the exhaust gas is high at the center portion, and is gradually reduced toward the outer peripheral portion of the honeycomb structure body. That is, the flow speed of the exhaust gas varies inside of the honeycomb structure body. As a result, the honeycomb structure body has an insufficient purification efficiency of exhaust gas.

In order to avoid this, there has been developed a honeycomb structure body having a structure in which cell walls are curved by a convex shape from the center portion to the outside or from the outside to the center portion of the honeycomb structure body (see patent document 1). In the honeycomb structure body having the structure previously described, the cell density continuously varies. As a result, this allows the exhaust gas to flow at a uniform flow speed in the overall honeycomb structure body.

CITATION LIST OF PRIOR ART TECHNIQUE

Patent Literature

[Patent document 1] Japanese patent laid open publication No. 2006-263947

SUMMARY OF INVENTION

Technical Problem to be Solved by Invention

However, the flow speed of the exhaust gas introduced into the inside of the honeycomb structure body varies due to the operation condition such as a throttle opening ratio, etc. Accordingly, there is a possible case of it being difficult to have a uniform flow speed even if the honeycomb structure body has a structure in which the cell density is continuously changed in a radial direction. Specifically, when the throttle opening is large, and an overall flow amount of the exhaust gas is large, it is possible for exhaust gas to flow in the overall honeycomb structure body at a flow speed having a uniform distribution. On the other hand, for example, when the throttle opening ratio is small and a less amount of exhaust gas is supplied, a large amount of the exhaust gas is concentrated into the cells having a large hydraulic diameter. Further, when the throttle opening ratio is small and a less amount of the exhaust gas is supplied, a temperature of the exhaust gas is reduced. This cools the honeycomb structure body. In this case, it is possible to easily deteriorate the activation degree of catalyst supported by the cells having a large hydraulic diameter, to which a large amount of exhaust gas is concentrated. Accordingly, there is a possible problem in which the exhaust gas purification performance decreases by a rapid acceleration of a vehicle after a low load driving or the vehicle starts after a vehicle temporary stop. Still further, because a large temperature difference occurs in the inside of the honeycomb structure body and a thermal stress is generated, cracks occur in the honeycomb structure body. This causes the honeycomb structure body breaking.

It is therefore desired to provide a honeycomb structure body capable of decreasing variation of exhaust gas purification performance due to a drive condition of a motor vehicle.

In accordance with one aspect of the present invention, there is provided a honeycomb structure body having a plurality of cells and cell walls arranged in a lattice arrangement. The cells are surrounded by the cell walls. The honeycomb structure body has a cell density distribution in which a cell density is reduced continuously or stepwise from a center portion to an outer peripheral portion in a radial direction. The honeycomb structure body previously described has wave shaped cell walls and flat shaped cell walls. The wave shaped cell walls extend in an axial direction. The flat shaped cell walls extend in the axial direction. The wave shaped cell walls are arranged in a formation section having a cell density ratio of not more than 0.85, where the cell density ratio is a ratio of a cell density to a maximum cell density. The flat shaped cell walls are arranged in a formation section at the center portion which is inside of the formation section of the wave shaped cell walls.

Effects of the Present Invention

The honeycomb structure body previously described has the cell density distribution in which a cell density is reduced continuously or stepwise in a radial direction from the center portion to the outer peripheral section. Accordingly, when a throttle opening is large and an overall flow amount of exhaust gas becomes large, it is possible to have a uniform flow speed of the exhaust gas in the inside of the honeycomb structure body. As a result, this makes it possible to reduce variation of exhaust gas purification performance of the honeycomb structure body through which a large amount of exhaust gas flows.

On the other hand, when a throttle opening is small and an overall flow amount of exhaust gas becomes small, a large amount of the exhaust gas flows in the section having a small cell density. In the structure of the honeycomb structure body, the wave shaped cell walls are arranged in the formation section having a small cell density, which satisfies the predetermined cell density ratio previously described, outside in the radial direction of the formation section at the center portion. Because the wave shaped cell walls have a large heat capacity, it is possible to suppress a temperature of the honeycomb structure body from decreasing even if a temperature of the exhaust gas decreases. From the point of view, this makes it possible to suppress a temperature of the honeycomb structure body from decreasing. In addition, it is possible to suppress decreasing the exhaust gas purification performance of the honeycomb structure body. Still further, the structure of the honeycomb structure body previously described makes it possible to reduce a temperature difference in the inside of the honeycomb structure body, and prevent generation of cracks in the honeycomb structure body by thermal stress.

In addition, the cell walls arranged in the formation section at the center portion, inside of the formation section of the wave shaped cell wall, are the flat shaped cell walls. This makes it possible to reduce increasing of a heat capacity of the honeycomb structure body as compared with a structure in which the wave shaped cell walls are arranged in the center portion. It is therefore possible to quickly increase a temperature of the honeycomb structure body, for example, immediately after an engine starts. From the viewpoint of this, it is possible to suppress the reduction of the exhaust gas purification performance. Further, because the honeycomb structure body has the flat shaped cell walls arranged in the formation section having a high cell density at the center portion, it is possible to suppress a pressure loss of the honeycomb structure body from increasing.

As previously described, the honeycomb structure body reduces the variation of the exhaust gas purification performance due to the drive condition. This makes it possible to reduce exhaust gas emission in all driving modes of a vehicle.

DESCRIPTION OF EMBODIMENTS OF THE PRESENT INVENTION

Figure 1:
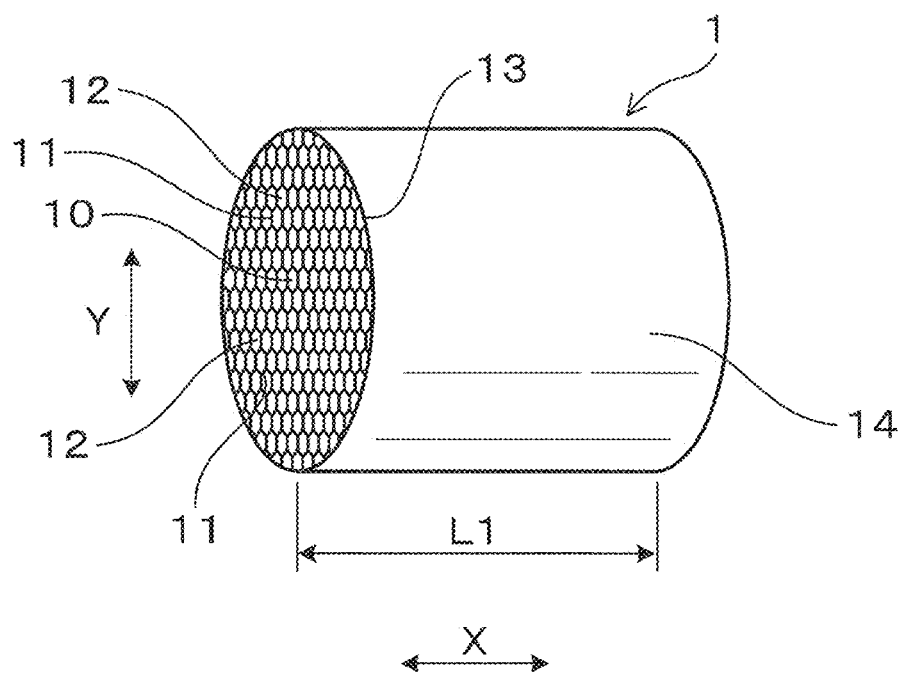
FIG. 1 is a perspective view showing a honeycomb structure body according to a first exemplary embodiment of the present invention.

Next, a description will be given of preferred embodiments of the honeycomb structure body.

In the honeycomb structure body, it is defined that a cell density indicates the number of cells per unit area. Specifically, when the unit area is defined by connecting center lines (formed along a central point in a thickness direction of the cell wall) of the cell walls of the cells, the number of cells present in the unit area indicates the cell density.

The honeycomb structure body according to the present invention has a structure in which a cell density is reduced continuously or stepwise from a center portion to an outer peripheral portion. The continuous reduction of the cell density indicates a structure in which the cell density of adjacent cells in a radial direction from the center portion to the outer peripheral portion is continuously reduced, for example. Further, reducing the cell density stepwise indicates a structure having a plurality of formation sections in which each of the formation sections has a constant cell density. The formation sections are arranged in a radial direction from the center portion to the outer peripheral portion. There is a concrete method of reducing the cell density continuously or stepwise by reducing a distance (cell pitch) between adjacent cells, for example. There is another method of changing a cell shape. It is acceptable to slightly shift a point having a maximum cell density from the center portion in a cross section of the honeycomb structure body so that the point is within a range capable of maintaining the action and effects of the present invention previously described.

It is acceptable to form the honeycomb structure body with a monolithic mold. It is further possible for the honeycomb structure body to have a plurality of segments connected together. It is preferable to produce the overall honeycomb structure body having a monolithic mold. This structure makes it possible to avoid using a connection section of the segments, and reduce a pressure loss of the honeycomb structure body.

The wave shaped cell walls have a structure in which a ratio (L2/L1) of a length L2 (see FIG. 5) of the wave shaped cell walls extending in a wave form along an axial direction of the honeycomb structure body to an overall length L1 in the axial direction of the honeycomb structure body is not less than 1.02. On the other hand, the flat shaped cell walls have the ratio L2/L1 of less than 1.02. It is acceptable that the overall wave shaped cell walls or a part thereof extending in the axial direction have a wave shape. That is, the cell walls are the wave shaped cell walls so long as these cell walls extending in the axial direction satisfy the relationship of L2/L1>=1.02 previously described. From the point of view of improving the exhaust gas purification performance by increasing a contact area between the exhaust gas and the cell walls, and from the point of view to suppress the reduction of catalyst activity due to a low temperature exhaust gas by increasing a heat capacity, it is preferable for the wave shaped cell walls to have a relationship of L2/L1>=1.05.

As previously described, the wave shaped cell walls are formed in the formation section having a cell density ratio of not more than 0.85, where the cell density ratio indicates a ratio of a cell density of the formation section to the maximum cell density. It is preferable that the wave shaped cell walls are formed in the formation section having the cell density ratio of not more than 0.8. This makes it possible to reduce variation of exhaust gas purification performance due to drive conditions, and reduce the exhaust gas emission in all driving modes of a vehicle. In addition to this action and effect, it is possible to provide the honeycomb structure body having an excellent reliability because of having a strength applied from outside stress.

For example, catalyst converters use the honeycomb structure body having catalyst in order to purify exhaust gas. In this case, catalyst is supported on the surfaces of the cell walls in the honeycomb structure body, and the catalyst is capable of purifying exhaust gas. Further, it is possible for the honeycomb structure body to have a porosity within a range of 10 to 70%, for example. Further, it is possible for the honeycomb structure body to have an average pore size of not less than 2 μm, for example. Still further, it is possible for the cell walls of the honeycomb structure body to have a thickness within a range of 40 to 160 μm, for example.

EMBODIMENTS

First Exemplary Embodiment

Next, a description will now be given of a plurality of honeycomb structure bodies (sample E1 to sample E3) according to the first exemplary embodiment, and a plurality of honeycomb structure bodies (sample C1 to sample C3) as comparative samples with reference to figures. First, the honeycomb structure body 1 as the sample E1 will be explained.

Figure 2:
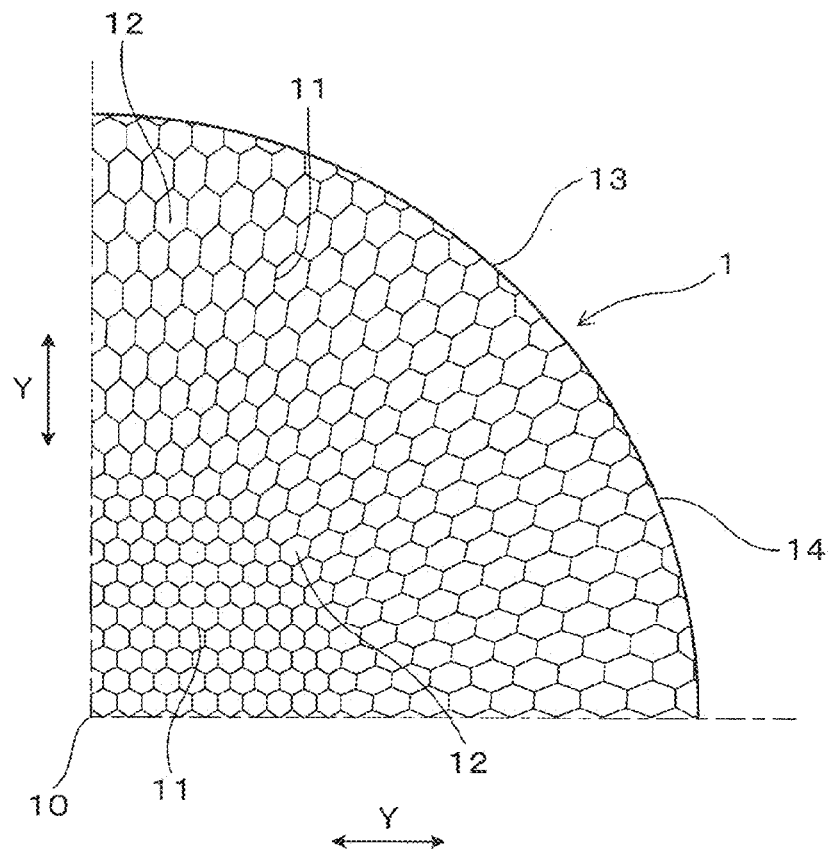
FIG. 2 is a view explaining a partial cross section, which is perpendicular to an axial direction, of the honeycomb structure body according to the first exemplary embodiment of the present invention.
Figure 3:
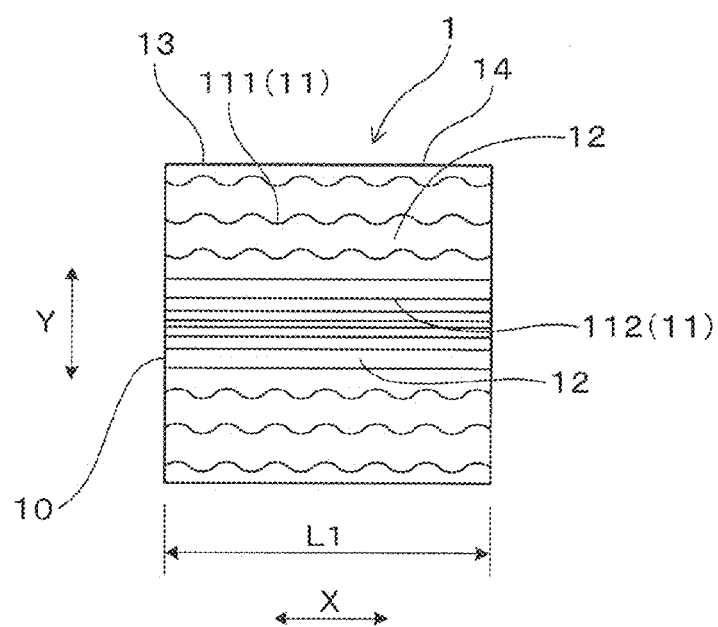
FIG. 3 is a schematic view explaining a cross section of the honeycomb structure body as a sample E1 according to the first exemplary embodiment.

As shown in FIG. 1 and FIG. 2, the honeycomb structure body 1 as the sample E1 has cell walls 11 and a plurality of cells 12. The cell walls 11 are arranged in a lattice arrangement to form the cells 12 so that the cell 12 is surrounded by the cell walls 11. The honeycomb structure body 1 has a cell density distribution in which a cell density is reduced continuously or stepwise from the center portion 10 in a radial direction Y to an outer peripheral portion 13. As shown in FIG. 3, the honeycomb structure body 1 has wave shaped cell walls 111 extending in an axial direction X and flat shaped cell walls 112 extending in the axial direction X. The wave shaped cell walls 111 are formed in a formation section having a cell density ratio of not more than 0.85. The cell density ratio is defined of a cell density to a maximum cell density. The cell walls 11, formed in the formation section at the center portion 10 and inside of the formation section of the wave shaped cell walls 111 are the flat shaped cell walls 112. A description will now be given of a detailed structure of the honeycomb structure body 1 according to the first exemplary embodiment.

As shown in FIG. 1, the honeycomb structure body 1 is used as a supporter capable of supporting catalyst capable of purifying exhaust gas. The honeycomb structure body 1 has the cell walls 11 arranged in a hexagonal lattice arrangement and a plurality of the cells 12 surrounded by the cells 11. The honeycomb structure body 1 has a cylindrical outer peripheral wall 14 so that the cell walls 11 and the cells 12 are formed inside of the cylindrical outer peripheral wall 14. The honeycomb structure body 1 is produced by using raw material powder having a cordierite composition. The honeycomb structure body 1 has an outside diameter of 103 mm, a length of 105 mm. The honeycomb structure body 1 has a monolithic mold structure. It is possible for the honeycomb structure body 1 to have the cells 12 of a rectangle shape. In this case, the cell walls 11 have a rectangle shape. It is also possible for the cells 12 to have a circular shape, a polygonal shape, etc., and for the cell walls 11 to have a circular lattice arrangement, polygonal lattice arrangement, etc.

Figure 4:
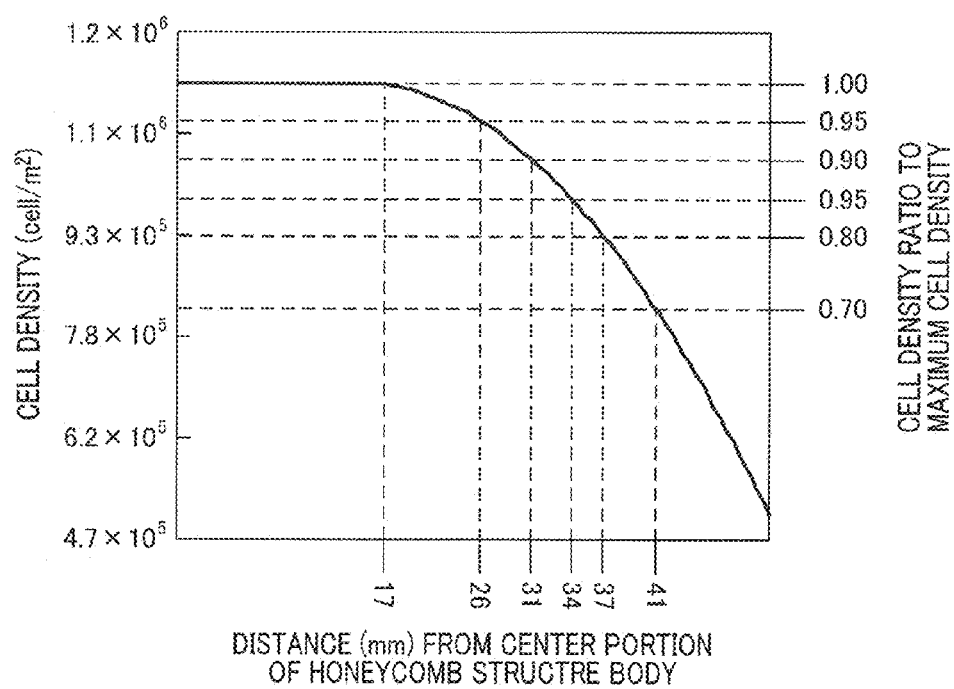
FIG. 4 is a view explaining a relationship between a distance measured from a center portion, a cell density and a cell density ratio of the honeycomb structure body as the sample E1 according to the first exemplary embodiment.

As shown in FIG. 2, the honeycomb structure body 1 has the cell density which is reduced from the center portion 10 in the radial direction Y to the outer peripheral portion 13. FIG. 4 is a view showing a relationship between a distance (mm) measured from the center portion 10 of the honeycomb structure body 1, the cell density (cells/m$^2$), and the cell density ratio. The cell density [cells/m$^2$] shown in FIG. 4 indicates the number of cells per 1 square meters. As shown in FIG. 2 and FIG. 4, the honeycomb structure body 1 according to the first exemplary embodiment has a structure in which a formation section until a length of 17 mm measured from the center portion 10 has a constant cell density, and a formation section until the outer peripheral portion 13 from the formation section having the length of 17 mm has a cell density which is continuously reduced.

Figure 5:
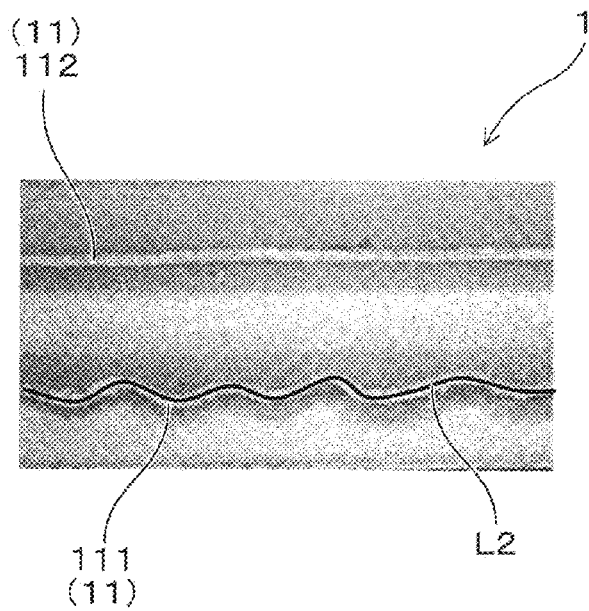
FIG. 5 is a view showing an optical photograph of cell walls extending along an axial direction of the honeycomb structure body as the sample E1 according to the first exemplary embodiment.

As shown in FIG. 3, the honeycomb structure body 1 has the wave shaped cell walls 111 extending in wave shape along the axial direction X and the flat shaped cell walls 112 extending in flat shape along the axial direction X. The wave shaped cell walls 111 are the cell walls 11 having a ratio (L2/L1) of not less than 1.02, where L1 indicates an overall length in the axial direction X of the honeycomb structure body 1, and L2 indicates an actual length of the wave shaped cell walls 111 extending in wave shape along the axial direction X (see FIG. 3 and FIG. 5). On the other hand, the flat shaped cell walls 112 are the cell walls 11 having a ratio L2/L1 of less than 1.02. FIG. 5 shows an optical microscope photograph (an SEM photograph) showing one example of the wave shaped cell walls 111, in which a curve indicates the actual length L2 of the wave shaped cell walls 111. The length L1 can be obtained by measuring a distance between both end surfaces in the axial direction of the honeycomb structure body 1 by using a Vernier caliper. The length L2 can be obtained by measuring an actual length of the cell walls extending in the axial direction by using an optical microscope, a scanning electron microscope (SEM), a non-contact type measuring apparatus, etc.

As shown in FIG. 3, the cell walls 11 formed in the outer section (at the outer peripheral portion 13 side) in a radial direction Y of the honeycomb structure body 1 are the wave shaped cell walls 111. The cell walls 11 formed in the inside section (at the center portion 10) in the radial direction Y of the honeycomb structure body 1 are the flat shaped cell walls 112. In the honeycomb structure body 1, the wave shaped cell walls 111 are formed in the cell walls 11 of the cells 12 having a cell density ratio of not more than 0.85 in the cells 12 having a cell density which is reduced toward the outside along the radial direction Y (see FIG. 3). In the honeycomb structure body 1 previously described, because the cell density is reduced in the radial direction Y from the center portion 10 toward the outer peripheral portion 13, a center section of the honeycomb structure body 1 has the maximum cell density.

In the honeycomb structure body 1, all of the cell walls 11 formed in the formation section having a cell density ratio of not more than 0.85 are the wave shaped cell walls 111 which satisfy the relationship of L2/L1>=1.02. On the other hand, all of the cell walls 11 formed in the section having a cell density ratio of more than 0.85 are the flat shaped cell walls 112. In other words, the cell walls 11 formed at the center portion 10 viewed from the formation section of the wave shaped cell walls 111 are the flat shaped cell walls 112

It is acceptable for all of or a part of the wave shaped cell walls 111 to have a wave shape. It is possible for the wave shaped cell walls 111 to have a waveform of a desired height. That is, the cell walls 11 are the wave shaped cell walls 111 (see FIG. 3 and FIG. 5) so long as these cell walls 11 extending in the axial direction X satisfies the relationship of L2/L1>=1.02. from the point of view to more increase a contact area with exhaust gas, it is more preferable for the wave shaped cell walls 111 to satisfy the relationship of L2/L1>=1.05.

The honeycomb structure body 1 was produced by using the following method. For example, kaolin, fused silica, aluminum hydroxide, alumina, talc, carbon particles, etc. were mixed together to produce cordierite raw material powder to have a final chemical composition of $SiO_2$: 45 to 55 wt %, $Al_2O_3$: 33 to 42 wt %, and MgO: 12 to 18 wt %. A predetermined amount of water, binder, etc. were added into the produced cordierite raw material, and the mixture was mixed to produce the ceramic raw material.

The ceramics raw material was extruded and shaped to produce a honeycomb mold body having a honeycomb shape by using an extrusion mold die. The extrusion mold die has slit grooves which correspond to the shape of the cell walls. After this, the honeycomb mold body was dried by using microwave, and cut into honeycomb mold bodies having a predetermined length. After this, the honeycomb mold bodies were fired at a predetermined maximum temperature within a range (of 1390 to 1430° C., for example) to produce the honeycomb structure body 1 having the structure shown in FIG. 1 to FIG. 3. The wave shaped cell walls 111 previously described were produced by increasing a feeding speed of the ceramics raw material during the extrusion mold process. Accordingly, in the formation section of the wave shaped cell walls 111, to partially increase the feeding speed of the raw material makes it possible to form the wave shaped cell walls 111 in the desired formation section previously described. It is also possible to adjust the feeding speed of the raw material in order to optionally change the ratio of the actual length L2 of the wave shaped cell walls 111 extending along the axial direction X to the total length L1 in the axial direction X of the honeycomb structure body 1. In order to form the wave shaped cell walls 111, there is a method of partially increasing the feeding speed of the raw material while reducing a flow passage resistance which is obtained by changing a flow passage width and a length of a part of the extrusion mold die for use in the production process of the honeycomb structure body 1. Further, there is another method of producing the wave shaped cell walls, which increases the feeding speed of the raw material by using the extrusion mold die, a part of which corresponding to the wave shaped cell walls 111 is polished in advance in order to reduce a wall surface resistance and a flow passage resistance. These methods can form the wave shaped cell walls 111 in the desired formation section.

Next, a description will be given of the wave shaped cell walls 111 as the sample E2 according to the first exemplary embodiment.

Figure 6:
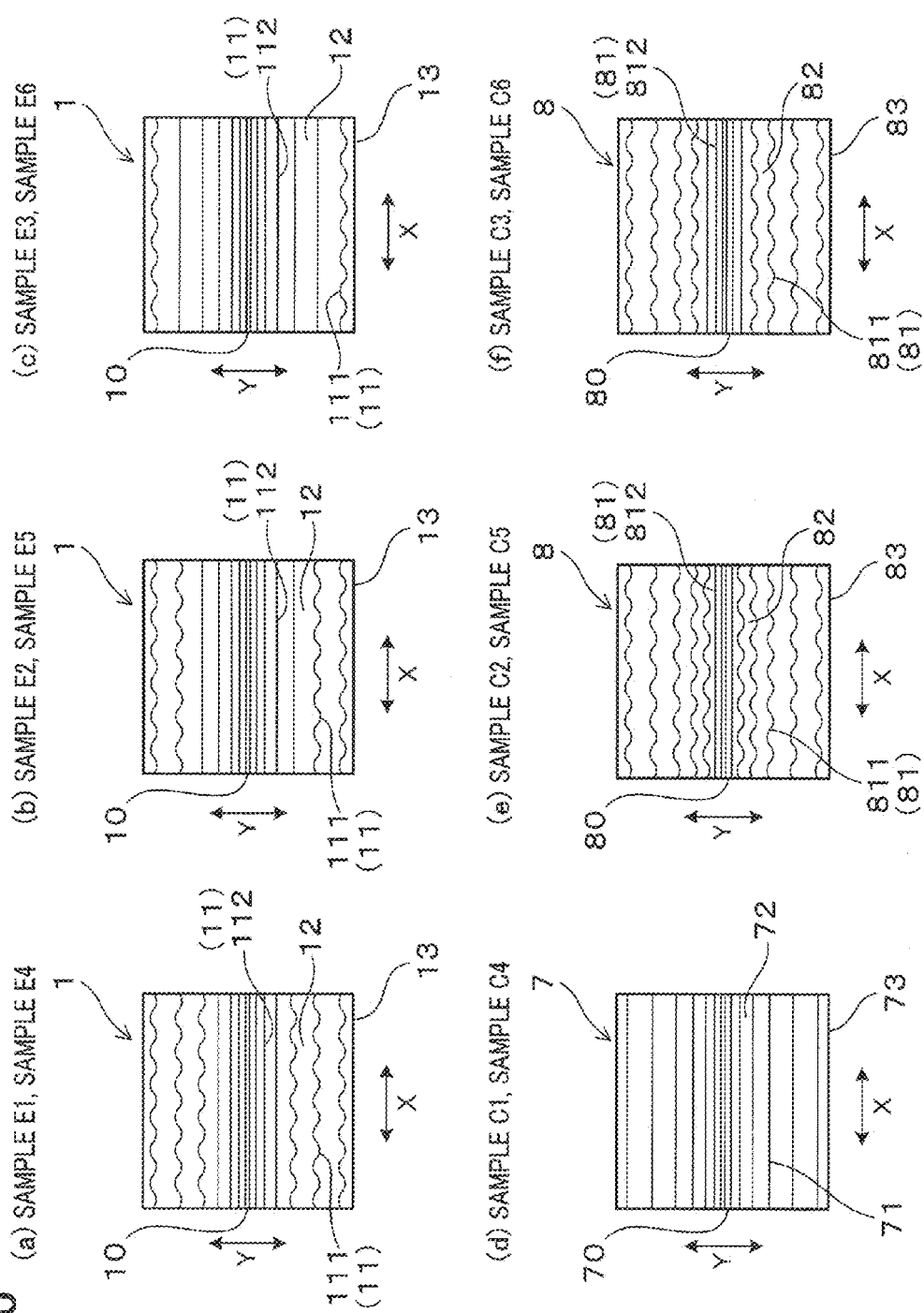
FIG. 6 is a schematic view explaining a cross section in an axial direction of each of the honeycomb structure bodies (samples E1 to sample E6) according to the first exemplary embodiment and a second exemplary embodiment, and each of honeycomb structure bodies (sample C1 to sample C6) as comparative samples.

FIG. 6 (a) to (f) show an explanation of a schematic cross section in an axial direction of each of the honeycomb structure bodies (sample E1 to sample E6) according to the first exemplary embodiment and the second exemplary embodiment and each of the honeycomb structure bodies (sample C1 to sample C6) according to the comparative examples.

FIG. 6 (b) shows a positional relation between the wave shaped cell walls 111 and the flat shaped cell walls 112 in the honeycomb structure body of the sample E2. In the sample E2, the wave shaped cell walls 111 are formed in a formation section more outside in the radial direction Y, as compared with the sample E1 (see FIGS. 6 (a) and (b)).

Specifically, as shown in FIG. 6 (b), the wave shaped cell walls 111 are formed as the cell walls 11 of the cells 12 having the cell density of not more than 0.80 in the formation section of the cells 12 having the cell density which is reduced in the radial direction Y from the central portion 10 toward the outer peripheral portion 13. On the other hand, all of the cell walls 11 formed in the formation section having the cell density ratio of more than 0.80 are the flat shaped cell walls 112. Other components of the sample E2 are the same of those of the sample E1.

Next, a description will be given of the honeycomb structure body 1 as the sample E3 according to the first exemplary embodiment.

FIG. 6 (c) shows a positional relation between the wave shaped cell walls 111 and the flat shaped cell walls 112 in the honeycomb structure body 1 of the sample E3. In the sample E3, the wave shaped cell walls 111 are formed in a formation section further outside in the radial direction Y, as compared with the sample E1 and the sample E2 (see FIG. 6 (a) to (c)). Specifically, as shown in FIG. 6 (c), in the honeycomb structure body 1, the wave shaped cell walls 111 are formed as the cell walls 11 of the cells 12 having the cell density ratio of not more than 0.70 in the formation section of the cells 12 having the cell density which is reduced in the radial direction Y from the central portion 10 toward the outer peripheral portion 13. On the other hand, all of the cell walls 11 formed in the formation section having the cell density ratio of more than 0.70 are the flat shaped cell walls 112. Other components of the sample E3 are the same of those of the sample E1.

FIG. 6 and FIG. 3 are views showing schematic positions of the wave shaped cell walls in the honeycomb structure body, but do not show an accurate cell density distribution. In addition, FIG. 6 (a) shows a positional relation between the wave shaped cell walls 111 and the flat shaped cell walls 112 in the honeycomb structure body 1 as the sample E1 to be compared with the sample E2 and the sample E3 shown in FIGS. 6 (b) and (c), respectively.

Next, a description will now be given of the honeycomb structure body 7 as the sample C1. FIG. 6 (d) is a view showing a shape of the cell walls 71 extending in the axial direction X of the honeycomb structure body 7. In the honeycomb structure body 7 shown in this drawing, all of the cell walls 71 have a flat shape. Other components of the sample C1 are the same of those of the sample E1. That is, the sample C1 does not have a wave shaped cell wall and the overall cell walls 71 have the flat shaped cell walls. Other components of the sample C1 are the same of those of the sample E1.

Next, a description will now be given of the honeycomb structure body 8 as the sample C2. FIG. 6 (*e*) shows a positional relation between wave shaped cell walls 811 and flat shaped cell walls 812 in the honeycomb structure body 8 of the sample C2. In the sample C2, the wave shaped cell walls 811 are formed more inside in a formation section in the radial direction Y as compared with the structure of the sample E1 to E3 (see FIG. 6 (*a*) to (*c*), and FIG. 6 (*e*)). Specifically, as shown in FIG. 6 (*e*), in the sample C2, the wave shaped cell walls 811 are formed as the cell walls 81 of the cells 82 having the cell density ratio of not more than 0.95 in the formation section of the cells 82 having the cell density which is reduced in the radial direction Y. On the other hand, all of the cell walls 81 formed in the formation section having the cell density ratio of more than 0.95 are the flat shaped cell walls 812. Other components of the sample C2 are the same of those of the sample E1.

Next, a description will now be given of the honeycomb structure body 8 as the sample C3. FIG. 6 (*f*) shows a positional relation between wave shaped cell walls 811 and flat shaped cell walls 812 in the honeycomb structure body 8 of the sample C3. In the sample C3, similar to the sample C2, the wave shaped cell walls 811 are formed more inside in the formation section in the radial direction Y as compared with the structure of the sample E1 to E3 (see FIG. 6 (*a*) to (*c*), and FIG. 6 (*f*)). Specifically, as shown in FIG. 6 (*f*), in the sample C3, the wave shaped cell walls 811 are formed as the cell walls 81 of the cells 82 having the cell density ratio of not more than 0.90 in the formation section of the cells 82 having the cell density which is reduced in the radial direction Y. On the other hand, all of the cell walls 81 formed in the formation section having the cell density ratio of more than 0.90 are the flat shaped cell walls 812. Other components of the sample C3 are the same of those of the sample E1.

A description will now be given of the action and effects of the honeycomb structure body 1 (the samples E1 to E3) according to the first exemplary embodiment.

As shown in FIG. 1, FIG. 2 and FIG. 4, the honeycomb structure body 1 as the samples E1 to E3 has the cell density distribution in which a cell density is reduced continuously or stepwise from the center portion 10 to the outer peripheral portion 13 in the radial direction Y. This makes it possible to have a uniform flow speed distribution in the honeycomb structure body 1 when a throttle opening is large and a large amount of exhaust gas flows. As a result, it is possible to reduce variation of exhaust gas purification function when a large amount of exhaust gas flows.

On the other hand, when the throttle opening is small and a small amount of exhaust gas flows, a large amount of the exhaust gas is concentrated to the cells 12 having a small cell density. The honeycomb structure body 1 as the samples E1 to E3 has the wave shaped cell walls 111 (see FIG. 3 and FIG. 6) having a small cell density section, which satisfies the predetermined cell density ratio, formed at the formation section outside of the central portion 10 in the radial direction Y. For example, as compared with the sample C1 as the comparative example, it is possible to increase the contact area between exhaust gas and the cell walls 11 in the formation section having the small cell density into which the exhaust gas flow is concentrated. This makes it possible to suppress the decreasing of the exhaust gas purification performance. In addition, because the wave shaped cell walls 111 has an increased heat capacity, it is possible to suppress the decreasing of a temperature of the honeycomb structure body 1 even if a temperature of the exhaust gas decreases. From the point of view, it is possible to suppress the deterioration of the exhaust gas purification performance.

Further, the cell walls 11 formed in the formation section inside of the formation section of the wave shaped cell walls 111 are the flat shaped cell walls 112 which extend in a flat shape along the axial direction X (see FIG. 6 (*a*) to (*c*)). As compared with the structure of the honeycomb structure body 8 as the samples C2 and C3 having the wave shaped cell walls 111 formed until the center portion 10, the structure of the honeycomb structure body 1 as the samples E1 to E3 can suppress its heat capacity from increasing. As a result, it is possible to quickly increase a temperature of the honeycomb structure body 1 even if immediately after the engine starts. From the point of view, it is possible to suppress the deterioration of the exhaust gas purification performance. As previously described, because the flat shaped cell walls 112 are formed in the formation section at the center portion 10, it is possible to suppress the increasing of a pressure loss of the honeycomb structure body 1.

As previously described, the honeycomb structure body 1 according to the first exemplary embodiment can reduce variation of the exhaust gas purification performance due to driving conditions.

Second Exemplary Embodiment

Next, a description will be given of the honeycomb structure body according to the second exemplary embodiment in which a cell density distribution which is different from that of the honeycomb structure body 1 according to the first exemplary embodiment. A description will now be given of the honeycomb structure body (the samples E4 to E6) according to the second exemplary embodiment and the honeycomb structure body (the sample C4 to C6) as the comparative samples.

Figure 7:
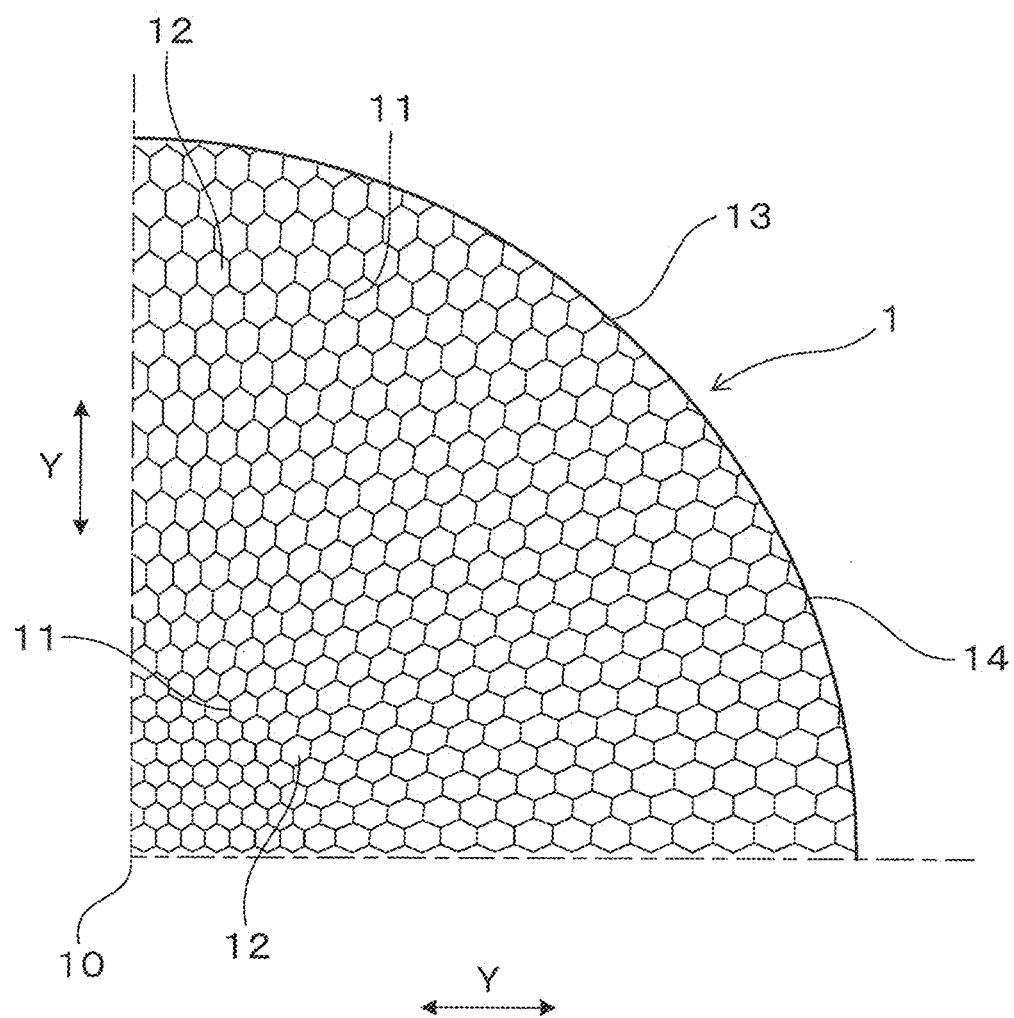
FIG. 7 is a view explaining a partial cross section, which is perpendicular to an axial direction, of the honeycomb structure body according to the second exemplary embodiment of the present invention.

As shown in FIG. 7, similar to the honeycomb structure body according to the first exemplary embodiment, the honeycomb structure body 1 (the samples E4 to E6) has a cell density which is reduced from the center portion 10 to the outer peripheral portion 13 in the radial direction Y. However, the second exemplary embodiment has a cell density which is different in change from the cell density of the first exemplary embodiment.

Figure 8:
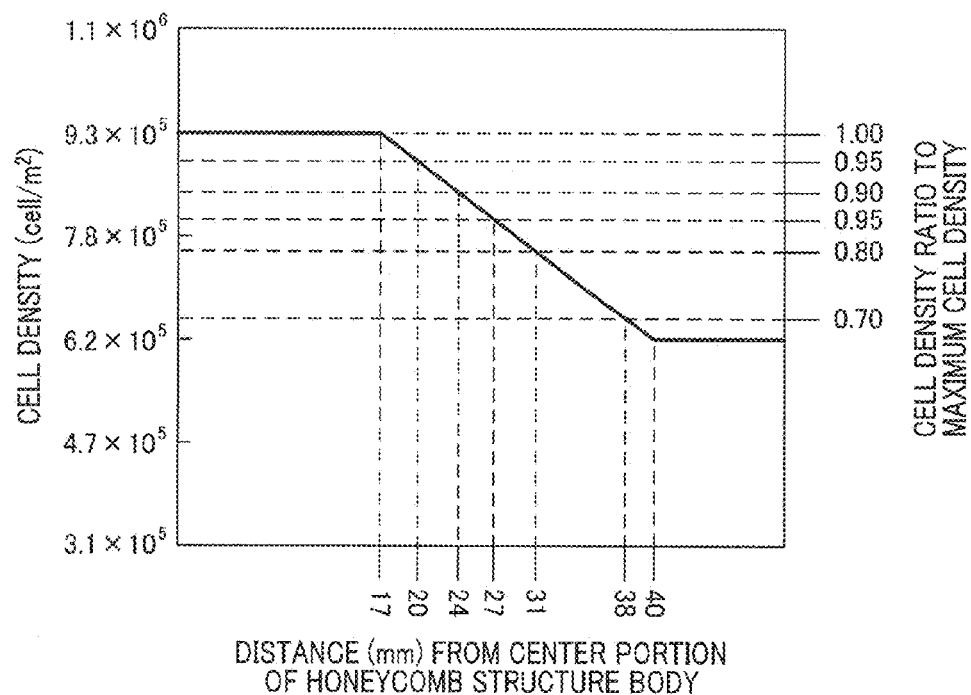
FIG. 8 is a view explaining a relationship between a distance measured from a center portion, a cell density and a cell density ratio of the honeycomb structure body according to the second exemplary embodiment.

FIG. 8 shows a relationship between a distance (mm) measured from the center portion 10, a cell density (cells/$m^2$) and a cell density ratio of the honeycomb structure body 1 according to the second exemplary embodiment. As shown in FIG. 7 and FIG. 8, in the honeycomb structure body 1 according to the second exemplary embodiment, the cell density is not changed until the distance of 17 mm measured from the center portion 10 in the radial direction Y. Further, the cell density is continuously reduced until the distance of 4.0 mm toward the outer peripheral portion 134 from this point. Still further, the cell density is not changed from this point to the outer peripheral portion 13. Other components, excepting the cell density, of the honeycomb structure body 1 according to the second exemplary embodiment are the same of those of the first exemplary embodiment. Omitted from the drawings, the honeycomb structure body as the samples C4 to C6 as the comparative examples has the same cell density distribution of the samples E4 to E6.

A description will now be given of each of the samples E4 to E6 according to the second exemplary embodiment.

In the honeycomb structure body 1 as the sample E4, similar to the sample E1 according to the first exemplary embodiment, all of the cell walls 11 formed in the formation section having a cell density ratio of not more than 0.85 are the wave shaped cell walls 111, and all of the cell walls 11 formed in the formation section having a cell density ratio of more than 0.85 are the flat shaped cell walls 112. Similar to the sample E1, FIG. 6 (*a*) shows the positional relation between the wave shaped cell walls 111 and the flat shaped cell walls 112 in the honeycomb structure body 1 as the sample E4.

In the honeycomb structure body 1 as the sample E5, similar to the sample E2 according to the first exemplary embodiment, all of the cell walls 11 formed in the formation section having a cell density ratio of not more than 0.80 are the wave shaped cell walls 111, and all of the cell walls 11 formed in the formation section having a cell density ratio of more than 0.80 have flat shaped cell walls 112 (not shown). Similar to the sample E2, FIG. 6 (*b*) shows the positional relation between the wave shaped cell walls 111 and the flat shaped cell walls 112 in the honeycomb structure body 1 as the sample E5.

In the honeycomb structure body 1 as the sample E6, similar to the sample E3 according to the first exemplary embodiment, all of the cell walls 11 formed in the formation section having a cell density ratio of not more than 0.70 are the wave shaped cell walls 111, and all of the cell walls 11 formed in the formation section having a cell density ratio of more than 0.70 are the flat shaped cell walls 112 (not shown). Similar to the sample E3, FIG. 6 (*c*) shows the positional relation between the wave shaped cell walls 111 and the flat shaped cell walls 112 in the honeycomb structure body 1 as the sample E6.

The honeycomb structure body 7 as the sample C4 has does not have the wave shaped cell wall, and all of the cell walls 71 are the flat shaped cell walls. Similar to the sample C1 explained in the first exemplary embodiment, FIG. 6 (*d*) shows the shape of the cell walls extending in the axial direction X.

In the honeycomb structure body 8 as the sample C5, similar to the sample C2 explained in the first exemplary embodiment, all of the cell walls 81 formed in the formation section having a cell density ratio of not more than 0.95 are the wave shaped cell walls 811, and all of the cell walls 81 formed in the formation section having a cell density ratio of more than 0.95 are the flat shaped cell walls 812 (not shown). Similar to the sample C2, FIG. 6 (*e*) shows the positional relation between the wave shaped cell walls 811 and the flat shaped cell walls 812 in the sample C5.

In the honeycomb structure body 8 as the sample C6, similar to the sample E3 according to the first exemplary embodiment, all of the cell walls 81 formed in the formation section having a cell density ratio of not more than 0.90 are the wave shaped cell walls 811, and all of the cell walls 81 formed in the formation section having a cell density ratio of more than 0.90 are the flat shaped cell walls 812 (not shown). Similar to the sample C3, FIG. 6 (*f*) shows the positional relation between the wave shaped cell walls 811 and the flat shaped cell walls 812 in the sample C6.

In the honeycomb structure body according to the second exemplary embodiment, the same reference numbers used in the first exemplary embodiment indicate the same components used in the first exemplary embodiment. The explanation of those is omitted here. The honeycomb structure body 1 as the samples E4 to E6 according to the second exemplary embodiment has the same action and effects of the first exemplary embodiment, as compared with those of the samples C4 to C6.

First Experiment

Next, a description will now be given of the evaluation of each of the honeycomb structure bodies (the samples E1 to E6) according to the first exemplary embodiment and the second exemplary embodiment previously described, and the evaluation of each of the honeycomb structure bodies (the samples C1 to C6) as the comparative samples. The evaluation contents are flow speed distribution, exhaust gas purification performance, pressure loss, and isostatic strength.

A description will now be given of the method of evaluating the flow speed distribution, the exhaust gas purification performance, the pressure loss and the isostatic strength.

[Evaluation of Flow Speed Distribution]

Figure 9:
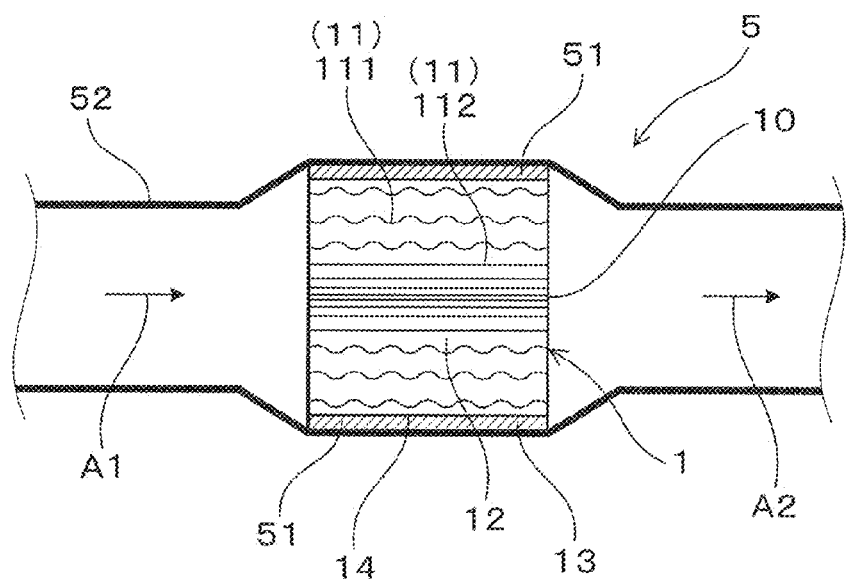
FIG. 9 is a view explaining a catalyst converter equipped with the honeycomb structure body according to a first experiment.
Figure 10:
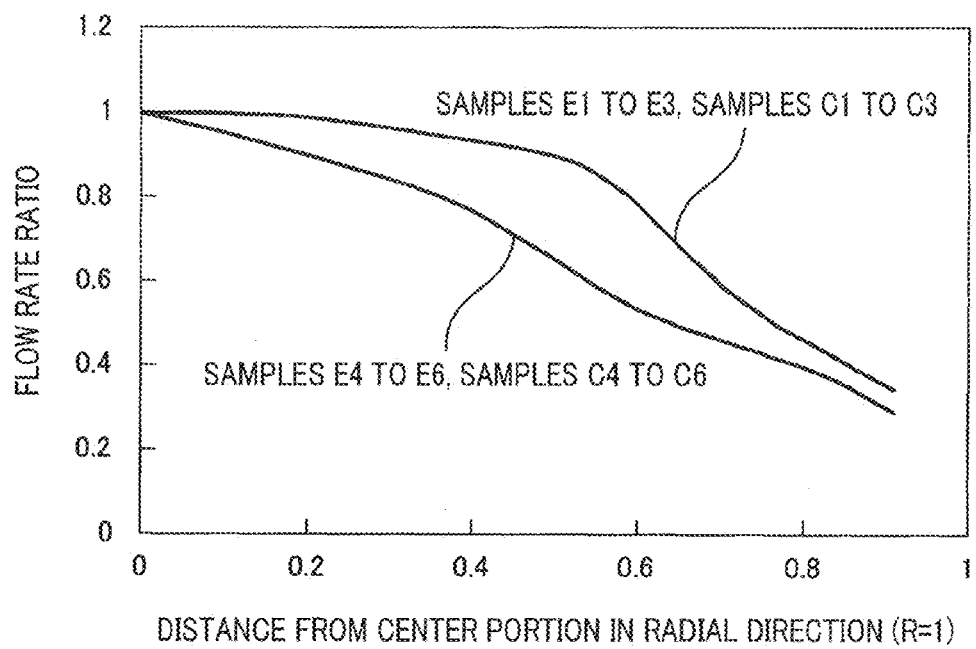
FIG. 10 is a view explaining a relationship between a distance and a flow speed ratio of high speed exhaust gas, where the distance is measured in a radial direction from the center portion of each of the honeycomb structure bodies (sample E1 to sample E6 and sample C1 to sample C6) according to the first experiment.
Figure 11:
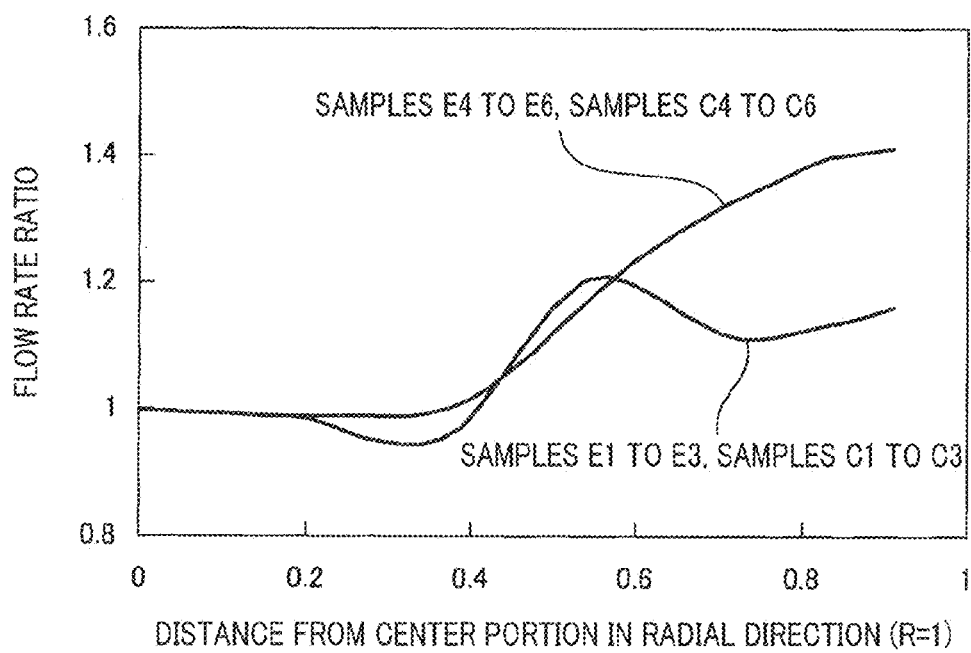
FIG. 11 is a view explaining a relationship between a distance and a flow speed ratio of low speed exhaust gas, where the distance is measured in a radial direction from the center portion of each of the honeycomb structure bodies (sample E1 to sample E6 and sample C1 to sample C6) according to the first experiment.

As shown in FIG. 9, a catalyst converter 8 was arranged in the inside of an exhaust gas pipe 52. The catalyst converter 8 was equipped with the honeycomb structure body 1 which was covered with aluminum sheet. The honeycomb structure body 1 supported catalyst therein in order to purifying exhaust gas. A flow speed meter (not shown) (MODEL 6115 manufactured by KANOMAX JAPAN INCORPORATED) was arranged at the downstream side of the honeycomb structure body 1. Next, as shown in FIG. 9, a predetermined amount of air A1 (high flow speed: 70 m/s, and low flow speed: 10 m/s) was supplied to the honeycomb structure body 1. At this time, a flow speed meter detects a flow speed of air A2 passed through the honeycomb structure body 1. This detection of the flow speed was performed at each location (the total number of the locations is 11) having a distance in a radial direction measured from the center portion of the honeycomb structure body. FIG. 10 and FIG. 11 show the positional relations between a distance (where, the honeycomb structure body has a radius R of 1 (R=1) measured from the center portion of the honeycomb structure body and the flow speed ratio. FIG. 10 shows the detection results when the flow speed is high. FIG. 11 shows the detection results when the flow speed is low.

[Evaluation of Exhaust Gas Purification Performance]

An emission rate was detected. Specifically, a catalyst converter 8 was produced, like the catalyst converter used in the evaluation of the flow speed distribution previously described. Because the honeycomb structure body 1 used in the evaluation of the exhaust gas purification performance has been used once in an engine operation, catalyst supported in the honeycomb structure body was deteriorated. Next, the honeycomb structure body 1 was mounted on a predetermined location in the exhaust gas pipe of a vehicle. After this, the vehicle drove under a predetermined drive mode (LA#4 evaluation mode) to detect emission (HC, CO, NOx) exhausted from the vehicle. The honeycomb structure body as the sample C1 detected an emission amount which is used as a criteria emission amount as the comparison criteria. An emission ratio of each of the samples E1 to E3, the sample C2 and the sample C3 was detected on the basis of the criteria emission amount of the honeycomb structure body as the sample C1. Similarly, an emission ratio of each of the samples E4 to E6, the sample C5 and the sample C6 was detected on the basis of the criteria emission amount of the honeycomb structure body as the sample C4. Table 1 and Table 2 show the detection results of the emission ratio of these samples.

Next, a temperature of catalyst supported in the honeycomb structure body 1 was detected. Specifically, a temperature sensor was arranged in the inside of the honeycomb structure body 1, and an inside temperature of the honeycomb structure body 1 was detected immediately after the low load operation. A temperature of the honeycomb structure body 1 was detected at nine detection locations, three detection locations in a radial direction x three detection locations in a longitudinal direction. Next, an average temperature of the detected results was calculated. A temperature of each of the samples E1 to E3, the sample C2 and the sample C3 was evaluated on the basis of a temperature detected in the honeycomb structure body 7 as the sample C1 as a comparison criteria. Similarly, a temperature of each of the samples E4 to E6, the sample C5 and the sample C6 was evaluated on the basis of the temperature detected in the honeycomb structure body 7 as the sample C4 as a comparison criteria. Specifically, when a detected temperature is lower than the criteria temperature of the sample C1 or the sample C4, the detected temperature is designated by the reference character "−", and when a detected temperature is higher than the criteria temperature of the sample C1 or the sample C4, the detected temperature is designated by the reference character "+". On the other hand, when there is no difference between them, the detected temperature is designated by the reference character "0". Table 1 and Table 2 show the evaluation results.

[Pressure Loss]

Next, a pressure loss of the honeycomb structure body 1 was detected. Specifically, a pressure loss detection device (not shown) was used to detect a pressure loss when gas (air) is supplied to the honeycomb structure body 1. The pressure loss detection device is equipped with a differential pressure gauge and a blower. The differential pressure gauge detects a difference (pressure difference) in pressure between gas immediately before the inlet of the honeycomb structure body and gas immediately after the outlet of the honeycomb structure body 1. The blower supplies the gas into the honeycomb structure body 1. Specifically, the catalyst converter 8 was produced (see FIG. 9) used in the evaluation of the flow speed distribution previously described. Next, the blower supplied gas into the inside of the exhaust gas pipe 52, and the differential pressure gauge detected a pressure difference at this time. The obtained pressure difference becomes a pressure loss. A flow speed of the gas flowing in the honeycomb structure body 1 was 4 $m^2$/minutes. A relative value of the pressure loss of each of the samples E1 to E3, the sample C2 and the sample C3 was obtained when the pressure loss of the sample C1 was 1. Similarly, a relative value of the pressure loss of each of the samples E4 to E6, the sample C4 and the sample C5 when the pressure loss of the sample C6 was 1. Table 1 and Table 2 show the detection results.

[Isostatic Strength]

The Isostatic strength was detected by performing experiments on the basis of JASO standard M505-87 issued by the Japanese Automotive Standards Organization.

A three way catalyst was used as catalyst to be supported in the honeycomb structure body 1. There is a three way catalyst, for example, a catalyst which includes at least one of platinum (Pt), Rhodium (Rh) and palladium (Pd), and oxygen absorber (catalytic promotor), such as γ-alumina and ceria.

TABLE 1

| Sample No. | | Sample E1 | Sample E2 | Sample E3 | Sample C1 | Sample C2 | Sample C3 |
|---|---|---|---|---|---|---|---|
| Maximum cell density (cells/$m^2$) | | | | 1.16 × $10^6$ | | | |
| Formation section of wave shaped cell walls | Cell density ratio | Not more than 0.85 | Not more than 0.80 | Not more than 0.70 | None | Not more than 0.95 | Not more than 0.90 |
| | Distance from central position in radial direction | More than 34 mm | More than 37 mm | More than 41 mm | None | More than 26 mm | More than 31 mm |
| Exhaust gas emission ratio | | 0.91 | 0.87 | 0.84 | 1 | 1.09 | 1.02 |
| Catalyst temperature immediately after low load driving | | + | + | + | Comparison criteria | + | + |
| Pressure loss | | 1.02 | 1.01 | 1.01 | 1 | 1.07 | 1.04 |
| Isostatic strength (MPa) | | 4.2 | 4.4 | 4.5 | 3.1 | 3.5 | 3.9 |

TABLE 2

| Sample No. | | Sample E4 | Sample E5 | Sample E6 | Sample C4 | Sample C5 | Sample C6 |
|---|---|---|---|---|---|---|---|
| Maximum cell density (cells/$m^2$) | | | | 9.3 × $10^5$ | | | |
| Formation section of wave shaped cell walls | Cell density ratio | Not more than 0.85 | Not more than 0.80 | Not more than 0.70 | None | Not more than 0.95 | Not more than 0.90 |
| | Distance measured from central position in radial direction | More than 27 mm | More than 31 mm | More than 38 mm | None | More than 20 mm | More than 24 mm |
| Exhaust gas emission ratio | | 0.94 | 0.89 | 0.87 | 1 | 1.07 | 1.03 |
| Catalyst temperature immediately after low load driving | | + | + | + | Comparison criteria | + | + |
| Pressure loss | | 1.06 | 1.04 | 1.02 | 1 | 1.14 | 1.09 |
| Isostatic strength (MPa) | | 5.1 | 5.3 | 5.4 | 4.2 | 4.5 | 4.8 |

As known from FIG. 10, when the exhaust gas had a high flow speed, each of the embodiments (the samples E1 to E6) and the comparative samples (the sample C1 to C6) had reduced variation of the flow speed regardless of the distance from the center portions 10, 70 and 80, i.e. regardless of the cell density. This means that each of the honeycomb structure bodies 1, 7 and 8 has a cell density distribution in which a cell density is reduced continuously or stepwise from the center portion 10, 70 and 80 to the outer peripheral portion 13, 73 and 83 (see FIG. 2 and FIG. 7). On the other hand, when the exhaust gas had a low flow speed, as known from FIG. 11, it can be understood that the portion near the outer peripheral portion 13, 73 and 83 in each of the honeycomb structure bodies 1, 7 and 8, specifically, the formation section having a low cell density has a high flow speed. In each of the honeycomb structure body 1, 7 and 8 of each of the samples E1 to E6 and the samples C1 to C6, there is a tendency of increasing variation of the flow speed when the flow speed of the exhaust gas is low.

On the other hand, Table 1 and Table 2 show, as the exhaust gas purification performance, an emission ratio of exhaust gas and a temperature of catalyst supported in the inside of the honeycomb structure body. It can be understood from Table 1 for the honeycomb structure body as the samples E1 to E3 to have the emission ratio of exhaust gas which is lower than that of the sample C1. Similarly, it can also be understood from Table 1 for the honeycomb structure body as the samples E4 to E6 to have the emission ratio of exhaust gas which is lower than that of the sample C4. This means that the wave shaped cell walls 111 are formed in the specific formation section having a cell density ratio of not more than 0.85 in the honeycomb structure body 1 as the samples E1 to E6 (see FIG. 6). That is, even if there is variation of flow speed of exhaust gas (see FIG. 10 and FIG. 11) in the samples E1 to E6, it is possible to reduce the emission ratio of exhaust gas, and to provide a superior exhaust gas purification performance.

Although the honeycomb structure body 8 as the samples C2 and C3 has the wave shaped cell walls 811, similar to the samples E1 to E3, the honeycomb structure body 8 as the samples C2 and C3 has an emission ratio which is higher than that of the sample C1 (see Table 1). Similarly, the samples C5 and C6 have the same tendency as compared with the sample C4 (see Table 2). This can be considered that the wave shaped cell walls 811 are formed in the formation section having a high cell density until the center portion 80 side in the honeycomb structure body 8 as the sample C2, the sample C3, the sample C5 and the sample C6 (see FIGS. 6 (*e*) and (*f*)), as compared with the honeycomb structure body according to the first and second exemplary embodiments. More specifically, it is necessary to wait a long time in order to increase a temperature of catalyst immediately before the engine starts because the honeycomb structure body 8 has a large heat capacity. As a result, it can be considered that an emission amount immediately before catalyst activation increases. From the point of view to further reduce the emission amount of exhaust gas to be supplied to the honeycomb structure body 1 according to the exemplary embodiments, it is preferable to form the wave shaped cell walls 111 in the formation section having a cell density ratio of not more than 0.8 (see the sample E2 and the sample E5), and more preferable to form the wave shaped cell walls 111 in the formation section having a cell density ratio of not more than 0.7 (see the sample E3 and the sample E6).

Further, the honeycomb structure body as the samples E1 to E3, the sample C2 and the sample C3 has a high temperature of catalyst immediately after a low load operation (see Table 1), which is higher than a temperature of the sample C1, because of suppressing a temperature of the catalyst from reducing. The samples E4 to E6, the sample C5 and the sample C6 have the same tendency as compared with the sample C4 (see Table 2). That is, because the honeycomb structure body 1 as the samples E1 to E6 has the structure in which the wave shaped cell walls 111 having a large heat capacity are formed in the formation section having a low cell density ratio, into which the exhaust gas is concentrated during a low load operation at which a temperature of exhaust gas is low, it is hard to cool the catalyst (see FIG. 6 (*a*) to (*c*)).

Still further, as can be understood from Table 1 and Table 2, There is a tendency for the honeycomb structure bodies 1 and 8 (the sample E1 to E6, and the sample C2, the sample C3, the sample C5 and the sample C6) having the wave shaped cell walls 111, 811 to have a pressure loss which is higher than that of the honeycomb structure body 7 (the sample C1 and the sample C4) having no wave shaped cell wall. However, it is possible to suppress the pressure loss from increasing (see Table 1 and Table 2) by using the cell walls 11 having a cell density ratio of more than 0.85 as the flat shaped cell walls 112 (see FIG. 6 (*a*) to (*c*)), like the structure of the samples E1 to E6.

From the point of view of it being possible to decrease the pressure loss by increasing the formation ratio of the flat shaped cell walls 112, it is in particular preferable to form at least all of the cell walls 11 as the flat shaped cell walls in the formation section having a cell density of more than 0.85.

As can be known from Table 1 and Table 2, there is a tendency of increasing the isostatic strength of the honeycomb structure body 1 according to the decreasing of the cell density ratio of the formation section of the wave shaped cell walls 111. When the wave shaped cell walls 111 are formed in the formation section having the cell density ratio of not more than 0.8, the tendency of increasing the isostatic strength is saturated. Accordingly, it is preferable to form the wave shaped cell walls 111 in the formation section having the cell density ratio of not more than 0.8, like the samples E2, E3, E5 and E6.

As shown by the results previously described, it is possible for the honeycomb structure body 1 as the samples E1 to E6 to provide the superior exhaust gas purification performance even if exhaust gas has a low average flow speed. This makes it possible for the honeycomb structure body 1 as the samples E1 to E6 to suppress variation of exhaust gas purification performance due to the change of driving conditions, etc.

Second Experimental Example

A description will be given of an experiment of comparing the emission ratio and the pressure loss ratio between various honeycomb structure bodies having different formation sections of the wave shaped cell walls as wave shaped cells. The honeycomb structure bodies used by the second experimental example have the cell density distribution shown in FIG. 4, similar to that of the first exemplary embodiment. As shown in FIG. 10 and FIG. 11 previously described, a low flow speed of exhaust gas reduces variation of the flow speed regardless of a magnitude of the cell density. On the other hand, a high flow speed of exhaust gas increases the variation of the flow speed.

This experimental example prepared the honeycomb structure bodies having different formation sections of the wave shaped cell walls which had different cell density ratios, i.e. not more than 0.7, not more than 0.75, not more than 0.8, not more than 0.83, not more than 0.85, not more than 0.87, not more than 0.88, not more than 0.9, not more than 0.91, not more than 0.93, not more than 0.95, and not more than 1. The experimental example prepared a honeycomb structure body having no wave shaped cell wall, like the sample C1 used in the first exemplary embodiment. Each of the honeycomb structure bodies used in this experimental example has the same structure of the sample E1 used in the first exemplary embodiment, excepting a different formation section of the wave shaped cell walls 111.

Next, similar to the first experimental example as previously described, the emission ratio and the pressure loss ratio of these honeycomb structure bodies were detected.

The emission ratio of each of the honeycomb structure bodies is a relative value to the emission ratio of 1 when the honeycomb structure body (the sample C1) has no wave shaped cell wall.

Figure 12:
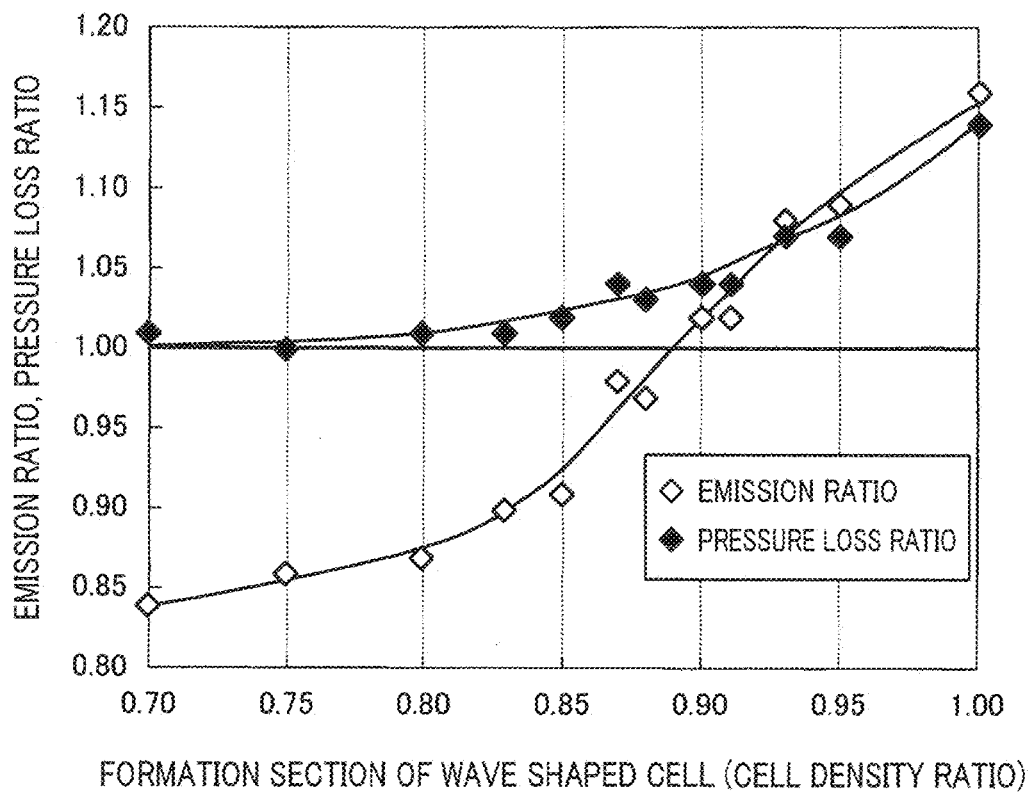
FIG. 12 is a view explaining a relationship between a formation section of the wave shaped cells that is, the wave shaped cell walls) and an emission ratio or a pressure loss ratio according to the second exemplary embodiment.

Similarly, the pressure loss ratio of each of the honeycomb structure bodies is a relative value to the emission ratio of 1 when the honeycomb structure body (the sample C1) having no wave shaped cell wall. FIG. 12 shows these results.

As shown in FIG. 12, increasing the formation section of the wave shaped cell walls has a tendency of increasing the emission ratio. However, when the honeycomb structure body has the formation section of the wave shaped cell wall having a cell density ratio of not more than 0.85, this makes it possible to adequately reduce the emission ratio of exhaust gas even if the flow speed of the exhaust gas varies. As a result, it is possible to provide the honeycomb structure body having an excellent exhaust gas purification performance. Adjusting the cell density ratio of the formation section of the wave shaped cell walls to a value of not more than 0.8 further reduces the emission ratio. In addition, as shown in FIG. 12, although the increasing of the formation section of the wave shaped cell walls has a tendency of increasing the pressure loss, it is possible to adequately prevent the pressure loss from increasing by adjusting the cell density ratio of the formation section of the wave shaped cell walls to a value of not more than 0.85. Adjusting the cell density ratio of the formation section of the wave shaped cell walls 111 to a value of not more than 0.8 makes it possible to further prevent the pressure loss from increasing.

What is claimed is:

1. A honeycomb structure body comprising
    a plurality of cells and cell walls arranged in a lattice arrangement, wherein
    the cells are surrounded by the cell walls,
    the honeycomb structure body has a cell density distribution in which a cell density is reduced continuously or stepwise from a center portion to an outer peripheral portion in a radial direction,
    the cells in the honeycomb structure body comprise wave shaped cell walls extending in an axial direction and flat shaped cell walls extending in the axial direction,
    the wave shaped cell walls are arranged in a formation section having a cell density ratio within a range of not more than 0.85, where the cell density ratio is a ratio of a cell density to a maximum cell density,
    the cell walls arranged in the formation section at the center portion side are the flat shaped cell walls as compared with the formation section in which the wave shaped cell walls are arranged,
    a formation section until a radial extent of 17 mm measured from the center portion in a radial direction has a constant cell density,
    a formation section until a radial extent of 40 mm, toward the outer peripheral portion, measured from the portion having the length of 17 mm, which is measured from the center portion, has a cell density which is continuously decreased, and
    a formation section from the point having the radial extent of 40 mm to the outer peripheral portion has a constant cell density.

2. The honeycomb structure body according to claim 1, wherein the wave shaped cell walls are formed in a formation section having a cell density ratio of not more than 0.8.

3. The honeycomb structure body according to claim 1, wherein a ratio of a length of the wave shaped cell wall extending in the axial direction of the honeycomb structure body to an overall length in the axial direction of the honeycomb structure body is not less than 1.02, and a ratio of a length of the flat shaped cell walls extending in the axial direction of the honeycomb structure body to the overall length in the axial direction of the honeycomb structure body is less than 1.02.

4. The honeycomb structure body according to claim 3, wherein the ratio of the length of the wave shaped cell walls extending in the axial direction of the honeycomb structure body to the overall length in the axial direction of the honeycomb structure body is not less than 1.05.

5. The honeycomb structure body according to claim 1, wherein the honeycomb structure body has a porosity within a range of 10 to 70%, an average pore size of not less than 2 μm, and a thickness of the cell walls is within a range of 40 to 160 μm.

6. The honeycomb structure body according to claim 1, wherein the formation section of the wave shaped cell walls has a cell density ratio of not more than 0.7.

* * * * *